United States Patent Office 3,687,845
Patented Aug. 29, 1972

3,687,845
SEPARATING TRAMP OILS FROM OIL-IN-WATER EMULSIONS
Lyle G. Treat, Ferguson, Mo., and Porter Hart, Lake Jackson, Tex., assignors to The Dow Chemical Company, Midland, Mich.
No Drawing. Filed May 15, 1970, Ser. No. 37,840
Int. Cl. B01d 17/04
U.S. Cl. 210—54    7 Claims

ABSTRACT OF THE DISCLOSURE

Accumulations of tramp oils are removed from oil-in-water emulsions utilized as cleaners, lubricants and coolants by introducing into the emulsion a small but effective amount of a high molecular weight, water-soluble anionic polymer and heating the treated emulsion at an elevated temperature whereby the tramp oils are coalesced and floated to the surface of the emulsion. The essentially continuous but distinct tramp oil and emulsion phases are then readily separated.

---

The instant invention concerns a method for purifying oil-in-water emulsions, such as are employed in the cleaning, lubricating and/or cooling of metal surfaces.

For instance, it is commonplace to utilize oil-in-water emulsions to lubricate and cool metals which are being fabricated as by rolling, drawing, cutting, milling, drilling and the like shaping operations. The emulsion is usually sprayed onto the surface being worked and sometimes the equipment utilized. It then drains off the workpiece or equipment and is recovered for reuse.

Frequently, in the use of such emulsions, foreign oils and greases accumulate from hydraulic oils, bearing lubricants and protective coatings to introduce a substantial quantity of a foreign oil phase, otherwise referred to herein as tramp oil. Usually, but not necessarily, such oils are of a substantially greater viscosity than the oil of the emulsion phase. If allowed to remain in the emulsion, the foreign oils result in the loss of desirable lubricity and the discoloration or grease staining of workpieces.

Separation of the tramp oils from the oil-in-water emulsion systems has been difficult with prior technology and this often has meant early discharge and replacement of the system; a result which is both expensive in the cost of the new materials and in the cost of treating the waste for satisfactory ultimate disposal. In the latter regard, it is considered relatively difficult to remove the principal components of the oil-in-water emulsions, i.e. hydrocarbons and dispersants from aqueous waste streams. Accordingly the discharge of emulsion lubricants has sometimes meant a significant pollution problem.

It would be desirable, and it is a principal object of the instant invention, to provide a new method for removing tramp oils from oil-in-water emulsions utilized in the metal working, fabricating and cleaning arts.

A further object is to provide a method for simple flotation of tramp oils without breaking the desired oil-in-water emulsion.

Still another object is to provide a direct and economical method for separating tramp oils from metal working lubricants and coolants.

A still further object is to provide an improved process for lubricating a metal rolling mill while minimizing lubricant waste discharge.

In accordance with the instant invention, the foregoing objects, and other benefits, as will become apparent hereinafter, are achieved by subjecting an oil-in-water emulsion to a processing sequence which comprises the following steps. To an oil-in-water emulsion containing, as basic ingredients, a water-immiscible oil, an anionic or nonionic surfactant and water and containing, as a foreign ingredient, a tramp oil phase is added a small amount of a high molecular weight, water-soluble, anionic polymer with sufficient agitation to disperse the polymer throughout the emulsion. The emulsion is energized, such as by heating at an elevated temperature sufficient to induce coagulation of the disperse tramp oil phase which then floats to the surface of the emulsion. Separation of the coalesced tramp oils is readily accomplished as by skimming or withdrawing the underflow emulsion.

The polymer utilized in the instant invention is characterized by having along the polymer chain a plurality of carboxylate and/or sulfonate groups having the formulas —COOM and —SO$_3$M, respectively. In these formulas, M is a water soluble cation, such as for example, an alkali metal, ammonium, water soluble amine or hydrogen. By "high molecular weight" is meant the polymers are of flocculent grade, i.e. they are capable of including the formation of flocs when added in small concentrations to aqueous suspensions of an oppositely charged disperse phase. A polymer has sufficient molecular weight for the purposes of the instant invention when a 0.5 percent by weight solution thereof in water at pH 4 and 25° C. exhibits a Brookfield viscosity of at least about 10 centipoises, preferably at least about 100 centipoises.

In a preferred operation, addition of the polymer is followed by a period of mild or gentle agitation during which polymer is dispersed throughout the system and agglomeration of disperse bodies of tramp oil is promoted. Normally, the emulsions will contain sufficient hardness ions and/or other metal ions to suitably condition the dispersed tramp oils for reaction with the polymer. If not, a small amount of polyvalent metal ion may be added so as to impart the necessary hardness to the emulsion for efficient treatment with the polymers according to the invention. Polyvalent metal ions that may be added for this purpose include the water soluble calcium, magnesium, aluminum and iron salts. From about 10 to 100 parts per million, based on the weight of the total system, will usually be sufficient to condition the tramp oils for coagulation.

Effective energy levels to promote coalescence and floating of the dispersed foreign oils will vary according to the nature and intrinsic viscosities of these oils. Although the instant invention is not predicated upon an explanation of any theory by which the invention operates, it is believed that the anionic polymer flocculates the dispersed foreign oils, which have not been stabilized in suspension by an anionic surfactant. This flocculation is promoted by the presence of polyvalent metal ions and any metal particles, which these oils may have accumulated from the environment of their use and from the aqueous phase of the emulsion. Once coagulated, the energizing step, e.g. heating, promotes their coalescence as by reducing their surface tension to provide a larger droplet of oil, which, due to a different density than water, either rises to the surface of the emulsion or settles to the bottom thereof to facilitate physical separation.

The oil-in-water emulsions purified in accordance with the instant invention comprise conventional water-immiscible oils, anionic or nonionic surfactants and water. Typical formulations are described by Treat in U.S. 3,409,551, beginning at column 2, lines 7 through column 3, line 25. In addition to the above essential components, the emulsions will frequently contain additives for special effects, such as antifoaming agents, reducing agents, and stabilizers.

Such emulsions will normally contain from about 80 to about 99 percent by weight water, as the external phase, in which there is dispersed from about 1 percent to about 20 percent, preferably from about 2 percent to about 10 percent by weight of an organic phase comprising a water-immiscible oil and an anionic surface active agent. The latter will be employed in an amount of from about 3 to about 15 percent, preferably from about 5 to about 10 percent, based on the weight of the oil.

The water-soluble, anionic polymers employed in the instant invention are characterized by substitution with a plurality of carboxylate and/or sulfonate groups. Water-soluble as used herein means that the polymers disperse in water to form visually homogeneous, continuous solutions. Suitable polymers can be prepared by the ethylenic polymerization of sodium acrylate, potassium styrene sulfonate, potassium vinylbenzyl sulfonate, sodium ethylene sulfonate, sodium maleate, and/or ammonium methacrylate. These monomers may be homopolymerized, or copolymerized by known methods with other ethylenically unsaturated monomers polymerizable therewith to prepare water-soluble polymers. Usually, a minimum of at least about 50 mole percent of the combined monomer moieties bearing water-solubilizing groups ensures that the resulting polymer is properly water-soluble. A minimum of about 4 mole percent of the monomer moieties combined in the finished polymer should bear an anionic substituent to assure sufficient anionic properties. Preferred polymers are sulfonated polyvinylaromatics of the benzene series, e.g. polystyrene and polyvinyl toluene which bear a plurality of sulfonate groups along the polymer backbone.

Other anionic polymers suitable for use in accordance with the invention are the high molecular weight, water-soluble copolymers of styrene and maleic acid. Such copolymers are generally employed in the form of the alkali metal salts thereof, preferably the sodium salt.

Anionic acrylic polymers that are useful in the present invention are water-soluble, high molecular weight polymers obtained by the vinyl polymerization of acrylic acid, methacrylic acid, sulfoethyl acrylate, carboxyethyl acrylate and water-soluble salts of the foregoing, or by copolymerization of the acidic monomers, or alkali metal salts thereof, with suitable amounts up to a major proportion, e.g. 90 mole percent or so, of other vinyl monomers such as acrylamide and methacrylamide.

Useful anionic polymeric agents can also be produced by hydrolysis of preformed nonionic polymers. For example, vinyl polymerized forms of acrylonitrile or methacrylonitrile can be hydrolyzed to convert the nitrile groups into the corresponding alkali metal carboxylate groups. Similarly, polymers or copolymers of alkyl esters of unsaturated acids can be saponified with an alkali metal hydroxide to convert ester groups to alkali metal carboxylate groups.

In the practice of the invention, the emulsion is treated with a small amount of the anionic polymer. Preferably from about .004 to about .01 percent by weight, and generally from about .001 to 0.1 based on the weight of the emulsion, induces effective flocculation of the disperse tramp oil phase. Although not necessary, it is preferred practice to administer the polymer to the solution in the form of a dilute water solution, usually containing from about 0.05 up to 0.5 percent by weight dissolved polymer solids. Initial administration of the polymer to the emulsion is readily accomplished by thoroughly, and preferably rapidly, mixing the polymer solution with the emulsion. This is usually accomplished by rapid and vigorous agitation, as by stirring with a paddle agitator for a period within the range from 1 up to about 15 seconds or so. Subsequently, the degree of agitation is reduced to avoid destroying forming agglomerates of tramp oil. Bcause the polymer is anionic and the emulsion is stabilized with an anionic or nonionic emulsifier, there is essentially little or no interaction between it and the emulsified oil phase.

Having carried out the addition of the polymer, the emulsion is energized to promote coalescence of the agglomerated oil phase. Effective coalescence is readily ascertained simply by maintaining an aliquot of the emulsion under quiescent conditions and observing whether oil globules float to the top or settle to the bottom, in the event the foreign oil is either sufficiently dense itself or sufficiently weighted with accumulated dense solids to sink in water. The energy input for this purpose is adequate when an essentially continuous oil phase is induced. Such a phase may contain some entrained water and perhaps emulsion particles but its constituency will be visibly distinct from that of the adjacent emulsion layer.

Energizing techniques include the application of high frequency sound, radiant heat and radio frequency energy forms as well as simple direct heating. When direct heating is used, some benefit of the invention will be achieved by increasing the emulsion temperature by at least about 10° C., preferably 20° C. Many of the commercial oil-in-water emulsions utilized as lubricants and coolants for metal working are employed at temperatures within the range of 40 to 65° C. Accordingly, treatment temperatures within the range from about 50 to about 75° C. will be sufficient to induce separation of flocculated tramp oils. Essentially equivalent inputs from the other energy forms will produce similar coalescence of the tramp oils.

Once the tramp oils have been coalesced into a distinct layer, they are readily separated by conventional physical separatory techniques such as skimming, decantation or simply withdrawing the underflow emulsion liquid. A preferred skimmer is a revolving, Teflon resin coated drum, the lower edge of which is slightly immersed into the liquid body.

In a specific embodiment, oil-in-water emulsion containing 5 percent of a mineral oil emulsified with a petroleum sulfonate was treated with a copolymer of acrylamide and sodium acrylate. The polymer had been prepared by polymerizing acrylamide and hydrolyzing about 30 weight percent of the initially available carboxamide groups to sodium carboxylate groups. The polymer had a 0.5 percent water solution Brookfield viscosity of about 2000 centipoises, which corresponded to a molecular weight of approximately 2 million. To each 1 liter of emulsion was added 40 milliliters of a 0.1 percent by weight solution of the polymer. Dispersion of the polymer throughout the emulsion was promoted by about 5 minutes of mild agitation with a laboratory paddle stirrer. The polymer addition increased the charge condition of the system from about 50 microamperes to 72 microamperes, as measured with a Leeds and Northrup "Hydroscan" meter. The latter instrument yields a measurement which is a function of the zeta potential of the emulsion and is generally proportional to the magnitude and polarity of the charge condtion of the emulsion particles. The meaning of the measurement is further described in U.S. Pat. 3,399,133.

The treated emulsion was then heated to about 60° C. and maintained under quiescent conditions for about 10 minutes. The tramp oils including, i.e., carrying, some dispersed dirt, coalesced and rose to the top of the emulsion phase. The resulting film of oil was easily separated by skimming.

In subsequent operations, the treated emulsion was readily filtered through a diatomaceous earth coated filter to remove further impurities.

In a manner similar to the foregoing, the removal of tramp oils from oil-in-water emulsions is promoted by the addition of flocculant grade sodium polystyrene sulfonate, potassium polyvinyl toluene sulfonate, sodium styrene-maleate copolymers, ammonium methacrylamide-acrylate copolymers, acrylamide oxazolidone copolymers and sodium acrylate-pyrrolidone copolymers.

What is claimed is:
1. A process which comprises:
introducing a flocculant-grade, water-soluble anionic polymer into a used oil-in-water emulsion contain- ing a tramp oil phase, said emulsion containing water, a water-immiscible oil and an anionic or nonionic surfactant, the amount of polymer present being within the range from about .001 to about .1 percent by weight of the oil-in-water emulsion, said polymer being further characterized as having along the polymer chain a plurality of at least one of carboxylate and sulfonate groups having the formulas —COOM and —SO$_3$M, respectively, wherein M is a water soluble cation selected from the group consisting of the cations of alkali metal, ammonium, water soluble amine and hydrogen, and energizing the polymer containing system sufficiently to promote coalescence of the tramp oil phase but substantially without breaking the oil-in-water emulsion, the energy input being sufficient to increase the temperature of the emulsion by at least about 10° C.

2. A process as in claim 1 and including the additional step of separating the coalesced oil from the emulsion.

3. A process as in claim 1 wherein the polymer is an alkali metal or ammonium polyvinyl aromatic sulfonate.

4. A process as in claim 1 wherein the polymer is an alkali metal or ammonium acrylamide-acrylate copolymer.

5. A process as in claim 1 wherein the polymer is characterized as essentially linear and by a dynamic viscosity of at least about 20 centipoises.

6. A process as in claim 1 wherein energizing of the system is accomplished by heating it sufficiently to increase the temperature thereof by at least 10° C.

7. A process a in claim 1 wherein the oil-in-water emulsion contains from about 1 to about 20 percent by weight of the disperse oil phase to thereby provide an effective lubricating emulsion.

References Cited

UNITED STATES PATENTS

| 3,478,874 | 11/1969 | McLean et al. | 210—23 |
| 3,316,181 | 4/1967 | Sackis | 252—344 |
| 3,528,928 | 9/1970 | Rushton | 252—344 X |
| 3,479,283 | 11/1969 | Harrison | 210—54 X |
| 2,027,965 | 1/1936 | Dellmann | 210—56 X |
| 3,090,759 | 5/1963 | Jenkins | 252—344 |

REUBEN FRIEDMAN, Primary Examiner

T. G. WYSE, Assistant Examiner

U.S. Cl. X.R.

210—56; 252—348

PO-1050
(5/69)

UNITED STATES PATENT OFFICE
CERTIFICATE OF CORRECTION

Patent No. 3,687,845          Dated  August 29, 1972

Inventor(s)    Lyle G. Treat and Porter Hart

It is certified that error appears in the above-identified patent and that said Letters Patent are hereby corrected as shown below:

Column 2, line 19, delete "including" and insert --inducing--.

Signed and sealed this 3rd day of April 1973.

(SEAL)
Attest:

EDWARD M. FLETCHER, JR.　　　　　　　　　ROBERT GOTTSCHALK
Attesting Officer　　　　　　　　　　　　Commissioner of Patents